(12) United States Patent
Chen et al.

(10) Patent No.: US 7,826,209 B2
(45) Date of Patent: Nov. 2, 2010

(54) DISK DRIVE MOUNTING APPARATUS

(75) Inventors: Yun-Lung Chen, Taipei Hsien (TW);
Jen-Chien Chiang, Taipei Hsien (TW);
Wan-Cheng Lin, Taipei Hsien (TW);
Rong-Yi Fei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 204 days.

(21) Appl. No.: 12/204,664

(22) Filed: Sep. 4, 2008

(65) Prior Publication Data
US 2009/0168326 A1 Jul. 2, 2009

(30) Foreign Application Priority Data
Dec. 28, 2007 (CN) .................... 2007 2 0201796

(51) Int. Cl.
*H05K 5/00* (2006.01)
(52) U.S. Cl. ..................... 361/679.37; 248/221.12
(58) Field of Classification Search ............ 361/679.33, 361/679.37, 679.39; 248/221.12, 309.1
See application file for complete search history.

(56) References Cited

U.S. PATENT DOCUMENTS

| | | | | |
|---|---|---|---|---|
| 4,979,909 A | * | 12/1990 | Andrews | 361/679.37 |
| 6,628,514 B2 | * | 9/2003 | Chen | 361/679.33 |
| 6,665,177 B2 | * | 12/2003 | Chen | 361/679.33 |
| 6,728,109 B1 | * | 4/2004 | Wu | 361/679.36 |
| 7,233,490 B1 | * | 6/2007 | Lai | 361/679.33 |
| 7,441,744 B2 | * | 10/2008 | Chen et al. | 248/309.1 |
| 7,495,909 B1 | * | 2/2009 | Chen et al. | 361/679.37 |
| 2009/0189042 A1 | * | 7/2009 | Chen et al. | 248/309.1 |

* cited by examiner

*Primary Examiner*—Lisa Lea-Edmonds
(74) *Attorney, Agent, or Firm*—D. Austin Bonderer

(57) ABSTRACT

A mounting apparatus is used to secure a disk drive, which defines a mounting hole therein. The mounting apparatus includes a bracket and a mounting member. The bracket is configured for receiving the disk drive therein. A through hole is defined in the bracket. A locking tab is formed on the bracket. The mounting member includes two arms and an operating portion. One end of each of the arms is pivotably secured on the bracket so that the mounting member is pivotable relative to the bracket, and the other end thereof connects with the operating portion. A positioning portion is formed on the operating member. The operating portion is capable of engaging with the locking tab of the bracket for inserting the positioning portion into the mounting hole of the disk drive via the through hole of the bracket.

17 Claims, 4 Drawing Sheets

DISK DRIVE MOUNTING APPARATUS

BACKGROUND

1. Technical Field

The present disclosure relates to mounting apparatuses, and more particularly to a mounting apparatus for securing disk drives in a bracket of a computer chassis.

2. Description of the Related Art

A disk drive is usually needed in a computer system to store and/or read data. In order to secure the disk drive to a bracket of the computer system, a mounting apparatus is provided.

In one example, the mounting apparatus includes a resilient, side-mounted engagement member and a rotatable lever. The engagement member is secured on a side wall of the disk drive. The rotatable lever is pivotably secured on a side plate of the bracket. In assembly, the disk drive with the engagement member is slid into the bracket. Then, the rotatable lever is rotated to insert a projection portion formed on the rotatable lever through an opening defined in the side plate of the bracket to engage with the engagement member, and the disk drive is thereby secured in the bracket. The mounting apparatus is convenient to secure the disk drive to the bracket, however, structures of the mounting apparatus are very complicated.

What is needed, therefore, is a mounting apparatus with simple structures for conveniently securing disk drives in a bracket.

DETAILED DESCRIPTION OF THE EMBODIMENTS

Figure 1:
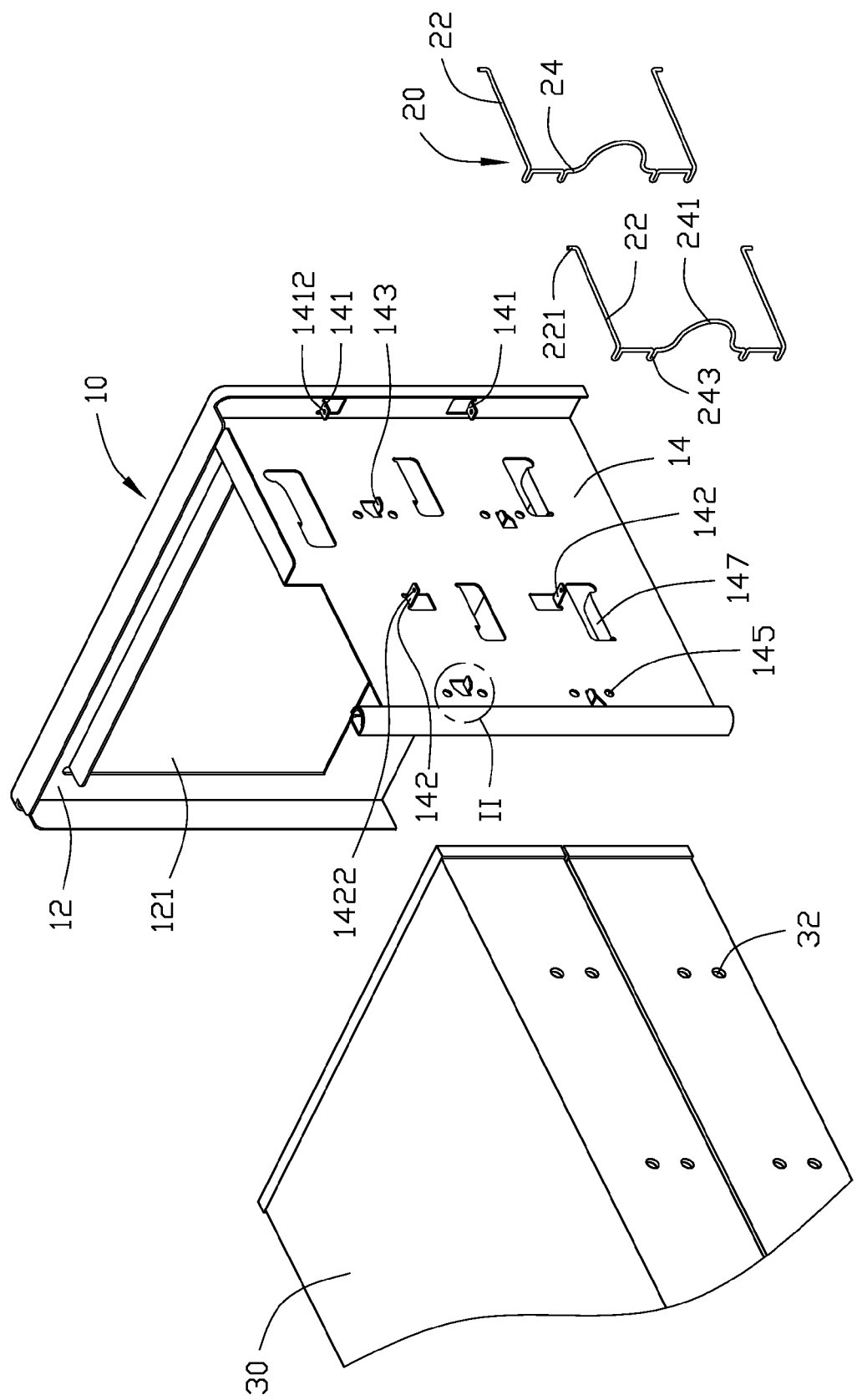
FIG. 1 is an exploded isometric view of one embodiment of a mounting apparatus and two disk drives, the mounting apparatus including a bracket and two mounting member.

Referring to FIG. 1, one embodiment of a mounting apparatus of the present disclosure is provided to secure two disk drives 30 to a computer chassis. Two pairs of mounting holes 32 are defined in a side wall of each of the disk drives 30. The mounting apparatus includes a bracket 10 of the computer chassis for receiving the disk drives 30 therein, and two mounting members 20 capable of preventing the disk drives 30 from sliding in the bracket 10.

Figure 2:
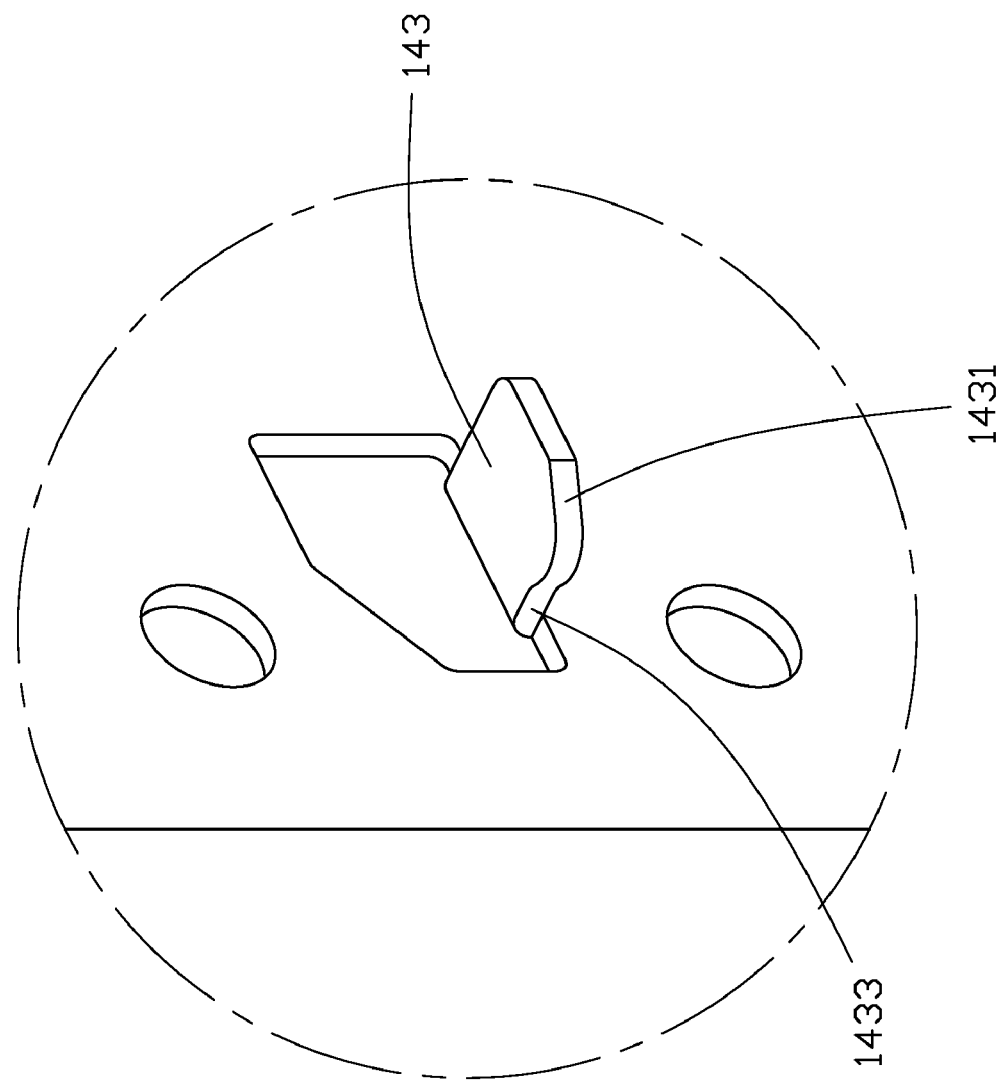
FIG. 2 is an enlarged view of circled portion II of FIG. 1.

The bracket 10 includes a front plate 12, and a side plate 14 formed on the front plate 12 and perpendicular to the front plate 12. The front plate 12 defines an opening 121 in one side of the side plate 14, and forms two parallel pivot pieces 141 at the opposite side of the side plate 14. Each of the pivot pieces 141 is perpendicular to the front plate 12, and defines a pivot hole 1412 therein. A plurality of support pieces 147 is perpendicularly bent in from the side plate 14 for supporting the disk drives 30. Two parallel pivot pieces 142 is perpendicularly bent outwards from the side plate 14. Each of the pivot pieces 142 is parallel to the pivot pieces 141, and defines a pivot hole 1422 therein. Referring also to FIG. 2, two locking tabs 143 arranged in a vertical direction are perpendicularly bent out from the side plate 14 at each of the left and right sides of the two pivot pieces 142. Each locking tab 143 is perpendicular to the front plate 12, and includes a transition portion 1431 and a locking portion 1433 connecting with the transition portion 1431. In the two locking tabs 143 arranged at either the left or right sides of the pivot pieces 142, the transition portion 1431 and the locking portion 1433 of one of the two locking tabs 143 are located opposite to the transition portion 1431 and the locking portion 1433 of the other one of the two locking tabs 143. An empty portion, such as a through hole 145, is defined in the side plate 14 at each of the opposite sides of each locking tab 143.

Each of the mounting members 20, for example, is made of a wire-shaped elastic member, and includes two parallel arms 22 and an operating portion 24 connecting with the two arms 22. A free end of each arm 22 is bent to form a pivot pin 221 for pivotably engaging into the pivot hole 1412, 1422 of each pivot piece 141, 142. The operating portion 24 can be resiliently deformable for passing across the transition portions 1431 of the corresponding locking tab 143, and then engaging with the locking portions 1433 of the corresponding locking tab 143. An arc-shaped handle portion 241 is formed on a middle portion of the operating portion 24 of each mounting member 20, and the operating portion 24 can be easily operated with the arc-shaped handle portion 241. Portions of the mounting member 20 are folded to form four positioning portions 243. The positioning portions 243 are insertable through the through hole 145 of the side plate 14 to lock into the corresponding mounting holes 32 of the disk drives 30. In this embodiment, two positioning portions 243 are formed on the operating portion 24 at opposite sides of the arc-shaped handle portion 241, and another two positioning portions 243 are formed on joints between the operating portion 24 and the two arms 22.

Figure 3:
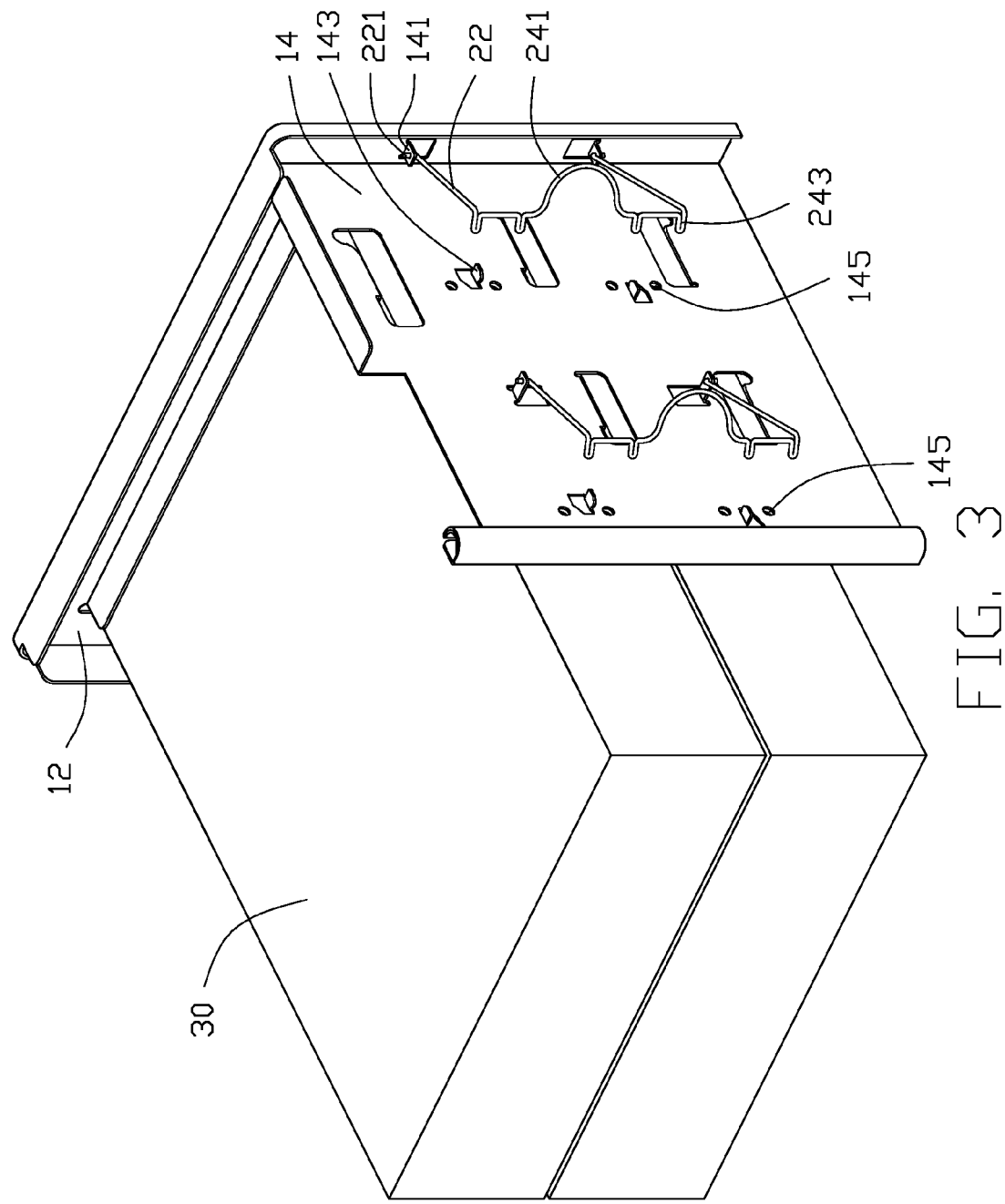
FIG. 3 is an assembled view of FIG. 1, showing each of the mounting members in an unlocked position.
Figure 4:
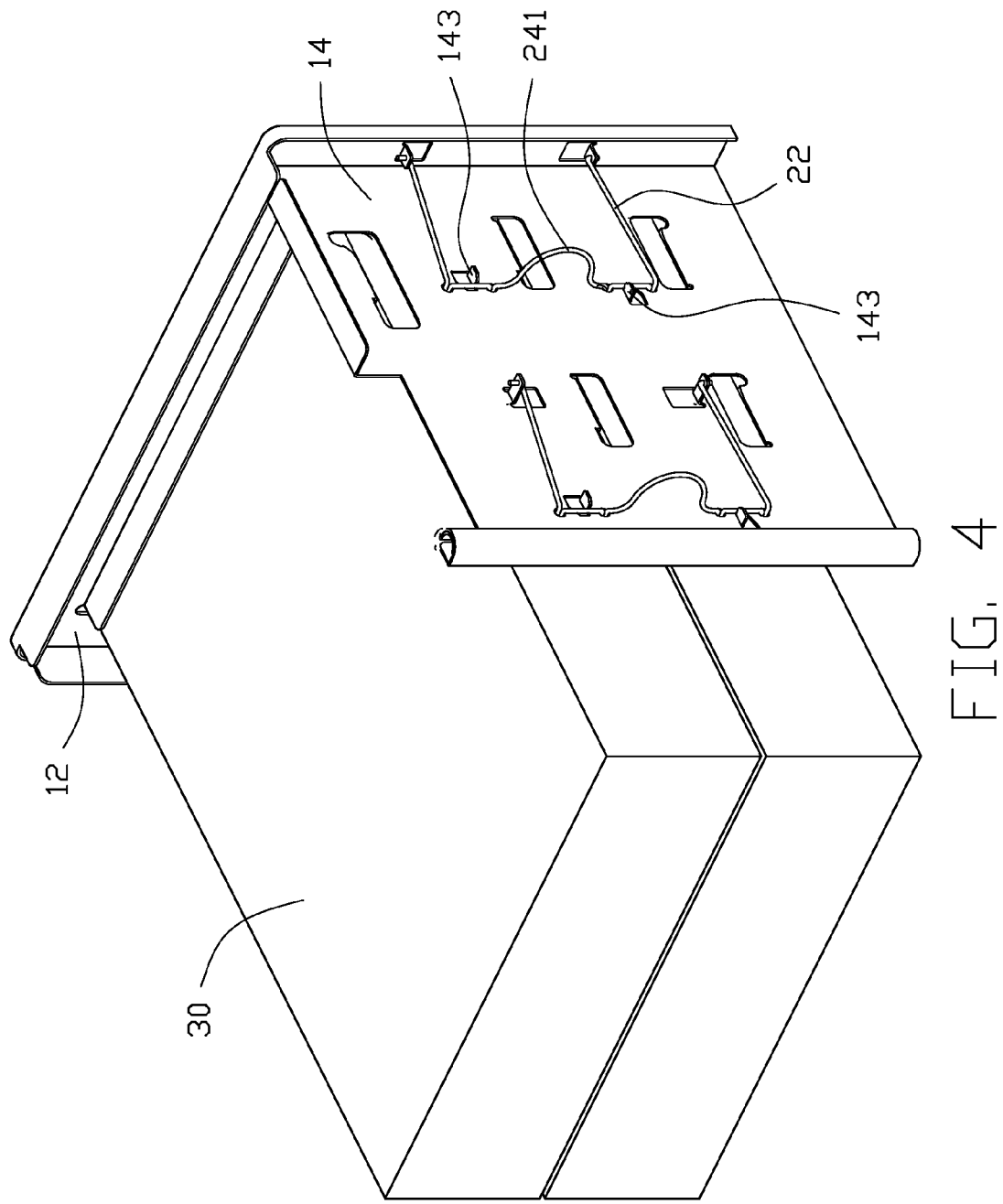
FIG. 4 is similar to FIG. 3, but showing each of the mounting members in a locked position.

Referring also to FIGS. 3 and 4, before assembling the disk drives 30 in the bracket 10, each of the pivot pins 221 of the mounting members 20 are pivotably inserted into the pivot holes 1412, 1422 of the corresponding pivot pieces 141, 142, and the mounting members 20 are respectively, pivotably secured on the front plate 12 and the side plate 14.

In assembling the disk drives 30 to the bracket 10, the disk drives 30 are inserted into the opening 121 of the front plate 12 along a direction in which the side walls of the disk drives 30 are parallel to the side plate 14 of the bracket 10, and positioned on a bottom edge of the opening 121 of the front plate 12 and the support pieces 147 of the side plate 14. When the mounting holes 32 of the disk drives 30 are correspondingly aligned with the through holes 145 of the side pane 14, each of the mounting members 20 are pivoted towards the side plate 14 until the operating portion 24 abuts on and is positioned between the transition portions 1431 of the corresponding locking tabs 143. At this time, the positioning portions 242 of the mounting members 20 align with or insert in the through holes 145 of the side plate 14. Then the operating portions 24 are resiliently deformed by urging the arc-shaped handle portion 241 so as to pass across the corresponding transition portions 1431. When the operating portions 24 engagingly pass across the corresponding transition portions 1431, the arc-shaped handle portion 241 of the operating portions 24 are released so that the operating portions 24 rebound and thereby engage with the locking portions 1433 of the locking tabs 143. The positioning portions 242 of the mounting members 20 are respectively inserted into the corresponding mounting holes 32 of the disk drives 30, and the disk drives 30 are thereby stably secured into the bracket 10.

In disassembling the disk drives 30 from the bracket 10, the operating portions 24 of the mounting members 20 are resiliently deformed by urging the arc-shaped handle portions 241 to respectively disengage from the corresponding locking portions 143, so that the mounting members 20 can be pivoted away from the side plate 14 of the bracket 10. When the positioning portions 243 respectively disengage from the mounting holes 32 of the disk drives 30 and the through holes 145 of the side plate 14, the disk drives 30 becomes removable from the bracket 10.

It is to be understood, however, that even though numerous characteristics and advantages have been set forth in the foregoing present disclosure, together with details of the structures and functions of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mounting apparatus for securing at least one disk drive defining at least one mounting hole therein, comprising:

a bracket configured for receiving the at least one disk drive therein, the bracket defining at least one through hole therein, a locking tab being formed on the bracket;

a mounting member comprising two arms and an operating portion, one end of each of the arms being pivotably secured on the bracket so that the mounting member is pivotable relative to the bracket, the other end of each of the arms connecting with the operating portion, at least one positioning portion being formed on the operating member, wherein the mounting member is capable of engaging with the locking tab of the bracket for inserting the at least one positioning portion into the at least one mounting hole of the at least one disk drive via the at least one through hole of the bracket.

2. The mounting apparatus of claim 1, wherein the at least one locking tab comprises a locking portion configured for engaging with the operating portion of the mounting member, wherein the at least one locking tab further comprising a transition portion connecting with the locking portion for blocking the operating portion from moving to engage with the locking portion.

3. The mounting apparatus of claim 1, wherein the at least one positioning portion is formed on the operating portion of the mounting member.

4. The mounting apparatus of claim 1, wherein the at least one positioning portion is formed on a joint between one of the arms and the operating portion of the mounting member.

5. The mounting apparatus of claim 1, wherein the mounting member is made of a wire-shaped resilient member.

6. The mounting apparatus of claim 1, wherein the bracket comprises a front plate and a side plate perpendicular to the front plate, and the mounting member is pivotably secured on front plate or the side plate.

7. The mounting apparatus of claim 6, wherein a plurality of support pieces is formed on the side plate, wherein each of the plurality of support pieces is perpendicular to the front plate and the side plate for supporting the at least one disk drive.

8. A mounting apparatus for securing at least one disk drive defining at least one mounting hole therein, comprising:

a bracket configured for receiving the at least one disk drive therein, the bracket defining at least one through hole therein, a locking tab being formed on the bracket;

a mounting member, at least one portion of the mounting member being folded to form at least one positioning portion, and the mounting member comprising two arms pivotably secured to the bracket and an operating portion connecting with the two arms, wherein the at least one positioning portion is formed on a joint between one of the arms and the operating portion of the mounting member, and the at least one positioning portion is insertable through the at least one through hole of the bracket for locking into the at least one mounting hole of the at least one disk drive when the mounting member is pivoted toward the bracket to engage the operating portion with the locking tab of the bracket.

9. The mounting apparatus of claim 8, wherein the locking tab comprises a locking portion for engaging with the operating portion of the mounting member, wherein the locking tab further comprises a transition portion connecting with the locking portion for blocking the operating portion from moving to engage with the locking portion.

10. The mounting apparatus of claim 8, wherein the mounting member is made of a wire-shaped resilient member.

11. The mounting apparatus of claim 8, wherein the bracket comprises a front plate and a side plate perpendicular to the front plate, and the mounting member is pivotably secured to the front plate or the side plate.

12. A mounting apparatus for securing a disk drive, comprising:

a bracket configured for receiving the disk drive therein, the bracket defining an empty portion therein, two locking tab being formed on the bracket;

a resilient mounting member comprising two arms pivotably secured on the bracket and an operating portion connected between the two arms, a positioning portion being formed on the mounting member, wherein the positioning portion is insertable through the empty portion of the bracket for engaging with the disk drive when the mounting member is pivoted toward the bracket to engage portions of operating portion with the two locking tabs of the bracket, the portions of the operating portion are resiliently deformed in opposite directions by the locking tabs when the mounting member is urged to pivot away from the bracket.

13. The mounting apparatus of claim 12, wherein the at least one locking tab comprises a locking portion for engaging with the operating portion of the mounting member, and a transition portion connecting with the locking portion for preventing the operating portion from moving to engage with the locking portion.

14. The mounting apparatus of claim 12, wherein the at least one positioning portion is formed on the operating portion of the mounting member.

15. The mounting apparatus of claim 12, wherein the at least one positioning portion is formed on a joint between one of the arms and the operating portion of the mounting member.

16. The mounting apparatus of claim 12, wherein the mounting member is made of a wire-shaped resilient member.

17. The mounting apparatus of claim 12, wherein the bracket comprises a front plate and a side plate perpendicular to the front plate, and the mounting member is pivotably secured on front plate or the side plate.

* * * * *